United States Patent

Becklin

[15] 3,655,215

[45] Apr. 11, 1972

[54] PORTABLE EQUIPMENT CASE

[72] Inventor: Dennis M. Becklin, Santa Clara, Calif.

[73] Assignee: Crate-Rite, Incorporated, Union City, Calif.

[22] Filed: June 5, 1970

[21] Appl. No.: 43,809

[52] U.S. Cl. ..............................280/79.2, 190/18 A, 280/37

[51] Int. Cl. ..............................B62b 5/00

[58] Field of Search ......................280/79.1, 79.2, 47.13, 37; 190/18 A; 16/18

[56] References Cited

UNITED STATES PATENTS

| | | | |
|---|---|---|---|
| 3,057,002 | 10/1962 | Levin et al. | 190/18.2 |
| 2,696,990 | 12/1954 | Davis | 280/79.1 |
| 1,561,122 | 11/1925 | Stahl | 190/18.2 |
| 2,805,077 | 9/1957 | Katz | 190/18.2 |
| 2,919,137 | 12/1959 | Brower et al. | 280/47.13 |

*Primary Examiner*—Benjamin Hersh
*Assistant Examiner*—Robert R. Song
*Attorney*—Naylor and Neal

[57] ABSTRACT

A portable equipment case including a base portion and a cover portion adapted to be secured together to confine equipment therein. At least one bracket member is attached to one of said portions and includes an integral extension having a support wheel affixed thereto adapted to project over the other of said portions and adjacent to a side wall of said other portion when said portions are secured together.

5 Claims, 4 Drawing Figures

INVENTOR.
DENNIS M. BECKLIN
BY
Naylor & Neal
ATTORNEYS

PORTABLE EQUIPMENT CASE

BACKGROUND OF THE INVENTION

The present invention relates to equipment handling, and more particularly, to a portable case adapted to hold said equipment to facilitate its movement from one location to another.

Today numerous types of portable equipment are available which are adapted to be transported by a businessman from one location to another. One example of equipment of this nature is Data Terminal equipment which may be transported to a desired location, connected to an ordinary telephone transmission line, and used to transmit or receive data over said line. Other examples of portable equipment finding increasing use are copying machines, audio-visual machines, etc. As will readily be appreciated, it is desirable to provide some form of protective means for equipment of this nature as it is being transported from location to location. Quite often, cases devised for this purpose are bulky and unwieldy with the full weight thereof along with the enclosed equipment being lifted during transport. Although wheeled cases have been devised in the past for the transport and protection of equipment, prior art cases of this type necessitate the complete removal of equipment at the desired location of equipment use due to their awkward construction and unesthetic appearance. In addition, many such prior art cases are of relatively complex construction, adding to the expense thereof.

SUMMARY OF THE INVENTION

It is therefore an object of the present invention to provide a portable equipment case of relatively simple construction wherein portable equipment may be retained in one portion thereof during use.

It is a further object of the present invention to provide a portable equipment case which incorporates a plurality of support wheels adapted to carry the full weight of the equipment to be transported.

The above-noted and other objects have been attained in accordance with the teachings of the present invention by providing a portable equipment case including a base portion and a cover portion, each defining an interior adapted to house therein equipment when said portions are secured together. At least one bracket member is secured to a side wall of one of said portions and includes an extension adapted to project over the other of said portions and adjacent to a side wall of said other portion. At least one support wheel is secured to said bracket member at a location on said projecting extension. In this manner, only one of the portions need have affixed thereto the support wheels so that the other of said portions may provide a base for the equipment at its point of use without ungainly support wheels projecting therefrom.

DESCRIPTION OF THE DRAWINGS

The above-noted and other objects of this invention will be understood from the following description taken with reference to the drawings wherein.

DESCRIPTION OF THE ILLUSTRATED EMBODIMENT

Figure 1:
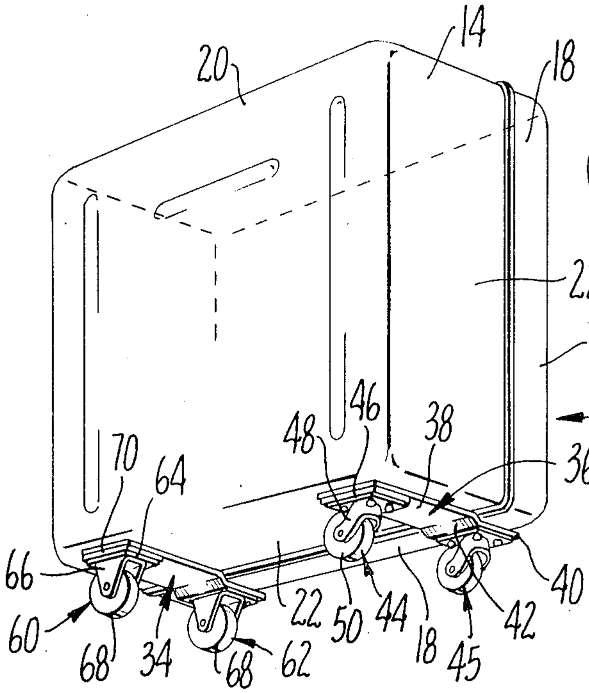
FIG. 1 is a perspective view of a portable equipment case constructed in accordance with the teachings of the present invention.
Figure 3:
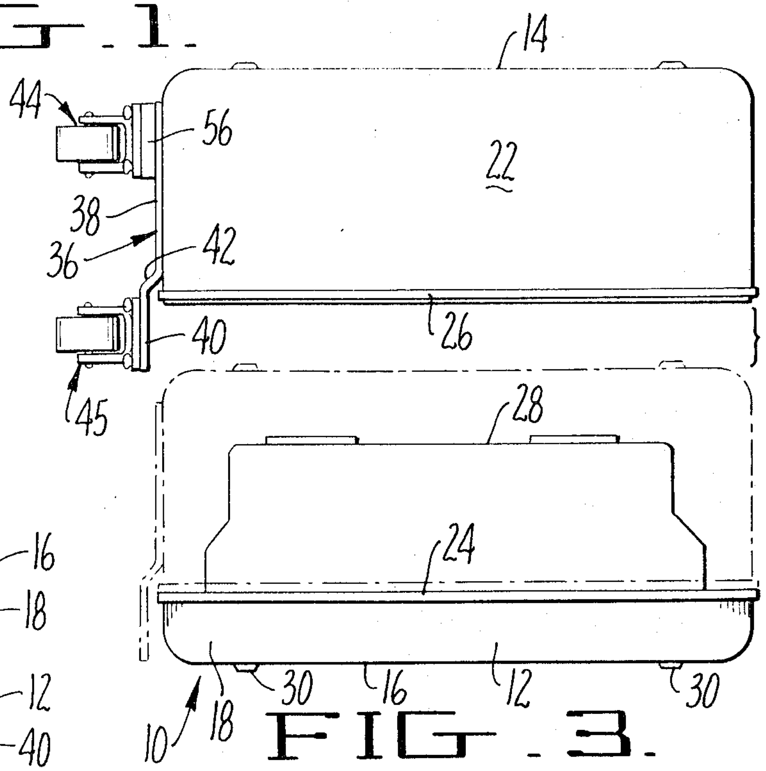
FIG. 3 is a front elevational view of the portable equipment case constructed in accordance with the present invention illustrating the cover portion thereof being lowered over the case base portion within which is disposed the equipment which is to be transported.
Figure 2:
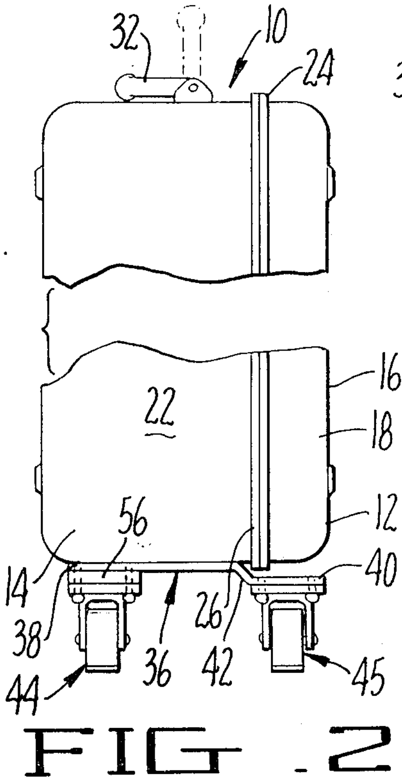
FIG. 2 is a front elevational view of the portable equipment case of FIG. 1 illustrating more clearly the relationship between the base and cover portions thereof and the associated brackets and support wheels.

Referring now to FIGS. 1–3, a portable equipment case constructed in accordance with the teachings of the present invention is generally designated by means of reference numeral 10. The case includes a base portion 12 and a cover portion 14. The base portion includes a bottom wall 16 and side walls 18, said side walls being integrally connected to bottom wall 16 and in cooperation therewith defining a first interior. Cover portion 14 comprises a top wall 20 and four integrally formed side walls 22 which define a second interior.

Base portion 12 has formed about the periphery thereof a flange 24 which, as may most readily be seen with reference to FIG. 3, projects outwardly about the periphery defined by side walls 18 so that it may accomodate therein side walls 22 of cover portion 14. Cover portion 14 is provided with a flange 26 which instead of being formed at the very ends of its associated side walls, as is the case with respect to flange 24, is spaced somewhat inwardly from the edges thereof so that flanges 24 and 26 may be placed in abutting position with portions of cover side walls 22 being disposed within flange 24 in an obvious manner. Any suitable locking means (not shown) may be used to lock the two portions in engagement when desired.

In FIG. 3 a piece of equipment 28 is illustrated as being disposed within base portion 12. For the purposes of illustration it shall be assumed that element 28 comprises Data Terminal equipment, however, it should be understood that the teachings of the present invention have application to many other types of portable equipment. When utilized in conjunction with equipment case 10, equipment 28 may be rigidly secured to one case shell or encapsulated with flexible, molded foam, cushions or flexible elastomer shock mounts. When equipment 28 is being operated in the desired location, cover portion 14 is removed from the base portion 12 thus exposing the working surfaces of the equipment. The base portion 12 is disposed with integrally formed support members 30 thereof resting on a suitable surface. It should be noted that the base portion 12, in addition to providing support for piece of equipment 28, establishes some degree of protection therefor without detracting from its overall appearance. After the equipment has been utilized and it is desired to transport it to another location, cover portion 14 is lowered over the base portion 12 and the flanges 24 and 26 brought into engagement. The suitable locking means (not illustrated) is then actuated to lock the two portions into position. A suitable handle 32 (FIG. 2) is pivotally secured to one of the side walls 22 of cover portion 14 whereby the case and equipment may be carried to another location.

To avoid fatigue on the part of the person transporting the combined case and equipment, the case is provided with wheeled support means upon which the case and equipment may roll when placed into engagement with a suitable support surface. The wheeled support means includes two brackets which are of substantially identical construction and are generally designated by means of reference numerals 34 and 36. Since the brackets are of substantially identical construction, only one such bracket, i.e., bracket 36, will be described in detail. Bracket 36 is constructed out of sheet metal and includes a mounting segment 38 and an extension 40. Mounting segment 38 and extension 40 are connected together by means of an integrally formed wall segment 42 which projects outwardly from the mounting segment so that the mounting segment and the extension lie along different planes in the manner illustrated.

The mounting segments of the brackets 34 and 36 are secured to the associated side wall 22 by means of any suitable fastener. Preferably, however, such fasteners are of a quick-release type adapted to pass through some of the apertures 43 formed in the bracket mounting segment into cooperative engagement with associated structure (not shown) in the cover portion side wall. The positioning of the brackets 34 and 36 is such that the extensions thereof extend outwardly of flange 26. Since the mounting segment of each bracket lies in a plane different from that occupied by associated extension 40 sufficient clearance is provided between the extension and the base portion flange 24 to enable the extension to pass thereover when the base portion and cover portion are secured together. When this is accomplished each bracket will project over base portion 12 and adjacent to a side wall 18 thereof. This relationship may be seen most readily with reference to FIGS. 2 and 3.

Figure 4:
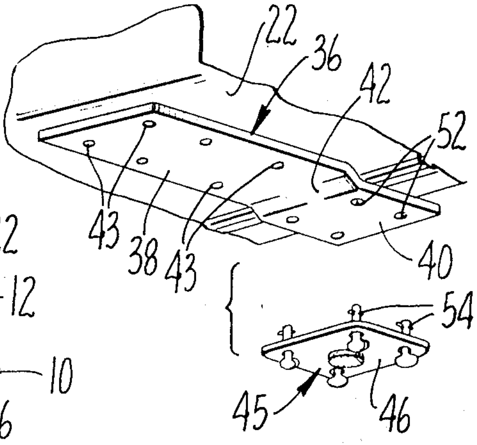
FIG. 4 is an enlarged fragmentary perspective view illustrating details of the portable equipment case bracket and related structure.

Connected to bracket 36 are caster units which are generally designated by means of reference numerals 44 and 45. Each caster unit comprises an apertured mounting plate 46, a swivel portion 48 and a wheel 50 connected to the swivel portion. Caster unit 45 is secured to extension 40 of bracket 36 by any suitable fastener means. Again, however, it is preferred that such fastener means be of the quick, disconnect type. One suitable arrangement for connecting the caster unit 45 to the extension 40 is shown in FIG. 4 wherein extension 40 is provided with apertures 52. Fasteners 54 are disposed through the mounting plate 46 in registry with apertures 52 so that the mounting plate 46 may be secured to extension 40 in an obvious manner. In the interest of simplicity, only the mounting plate 46 of the caster unit 45 has been illustrated.

In like manner, caster unit 44 is secured to the mounting segment 38 of bracket 36 by suitable fasteners which extend through the apertures of the mounting plate and certain of the apertures 43 of the bracket mounting segment 38 which are disposed in registry therewith. It should be noted that a spacer plate 56 is disposed between caster unit 44 and the bracket 36. The spacer plate 56 has a thickness substantially equal to the distance between the outermost surfaces of mounting segment 38 and extension 40 so that caster units 44 and 45 are disposed in the same horizontal plane when the equipment case is positioned as indicated in FIG. 2.

Referring now to FIG. 1, bracket 34 also has operatively associated therewith wheeled support means. In this instance, however, the wheeled support means, which are designated by means of reference numerals 60 and 62, each comprise a mounting plate 64, a U-shaped bracket 66 fixedly secured to the mounting plate and a wheel 68. Since no swivel action is provided between each U-shaped bracket 66 and its associated mounting plate 64, wheels 68 serve to impart stability to the portable equipment case 10 as it is rolled along a support surface. A spacer plate 70, similar in construction to spacer plate 56 is provided between wheeled support means 60 and the mounting segment of bracket 34 to maintain the wheels 68 along substantially the same horizontal plane. Once again, it is preferred that fasteners of any suitable quick-connect type be utilized to attach bracket 34 to cover portion 14 and wheeled support means 60 and 62 to that bracket.

It should be noted that the aforedescribed bracket arrangement effectively places caster unit 45 and wheeled support means 62 under base portion 12 when the portable equipment case 10 is positioned as illustrated in FIG. 2. Since piece of equipment 28 is positioned within the case so that it is confined within the interiors defined by both base portion 12 and cover portion 14, the center of gravity thereof will lie along a vertical line extending somewhere between caster units 44 and 45 and between wheeled support means 60 and 62. This arrangement provides stability for the case and the housed equipment as it is being wheeled upon a support surface. Rather than employ caster units on one bracket and fixedly mounted rotatable wheels on the other bracket, either all caster units or all fixedly mounted rotating wheels may be utilized on the equipment case without departing from the spirit or scope of the present invention. It is desirable to use quick-disconnect type fasteners in the foregoing arrangement since this permits the complete removal of the bracket and associated structure from the cover portion. This may be desirable, for example, when the portable equipment case is being shipped by airplane or the like wherein the external support wheels could present difficulties in the baggage handling operation. The brackets and associated support wheels could during air shipment be mounted within the portable case portions. Rather than employ a single bracket member for mounting two wheels, a separate bracket member may be utilized for each wheeled unit. For example, caster unit 44 may, if desired, be mounted on a mounting segment other than that associated with bracket 36. This could be done merely by shortening mounting segment 38 and providing between the mounting plate 46 of caster unit 44 and the wall 22 of the cover portion a spacer plate having a thickness greater than spacer plate 56 of an increment equal to the thickness of bracket 36.

From the foregoing detailed description, it is believed apparent that the present invention enables the accomplishment of the objects initially set forth herein. It should be understood, however, that the invention is not intended to be limited to the details of the illustrated embodiment, but rather is defined by the accompanying claims.

I claim as my invention:

1. A portable equipment case comprising, in combination:
a base portion comprising a bottom wall and side walls and defining a first interior;
a cover portion comprising a top wall and side walls and defining a second interior;
means for securing said portions together so that said first and second interiors are in communication, whereby equipment may be confined within said portions, said means including outwardly projecting cooperating flanges formed on the side walls of said base and cover portions;
bracket means secured to a side wall of one of said portions and including an extension adapted to project over said flanges and over the other of said portions and adjacent to a side wall of said other portion when said portions are secured together, said bracket means comprising a mounting segment adapted to be secured directly to one of said portions by fastener means, said mounting segment being integrally connected to said extension by an outwardly projecting wall segment whereby said mounting segment and said extension lie along different planes; and
a support wheel secured to said bracket means at a location on said projecting extension.

2. The portable equipment case of claim 1 wherein said mounting segment is releasably secured to said one portion whereby said bracket means and support wheel are adapted to be selectively removed from said one portion.

3. The portable equipment case of claim 1 further comprising at least one additional support wheel in operative association with and adapted to extend outwardly from the side wall to which said bracket means is secured.

4. The portable equipment case of claim 3 wherein said support wheel and said additional support wheel are mounted upon a single bracket member.

5. The portable equipment case of claim 3 wherein spacer means is provided between said additional support wheel and said bracket means.

* * * * *